(No Model.) 3 Sheets—Sheet 1.
A. VIALE.
WATER CLOSET.
No. 535,967. Patented Mar. 19, 1895.
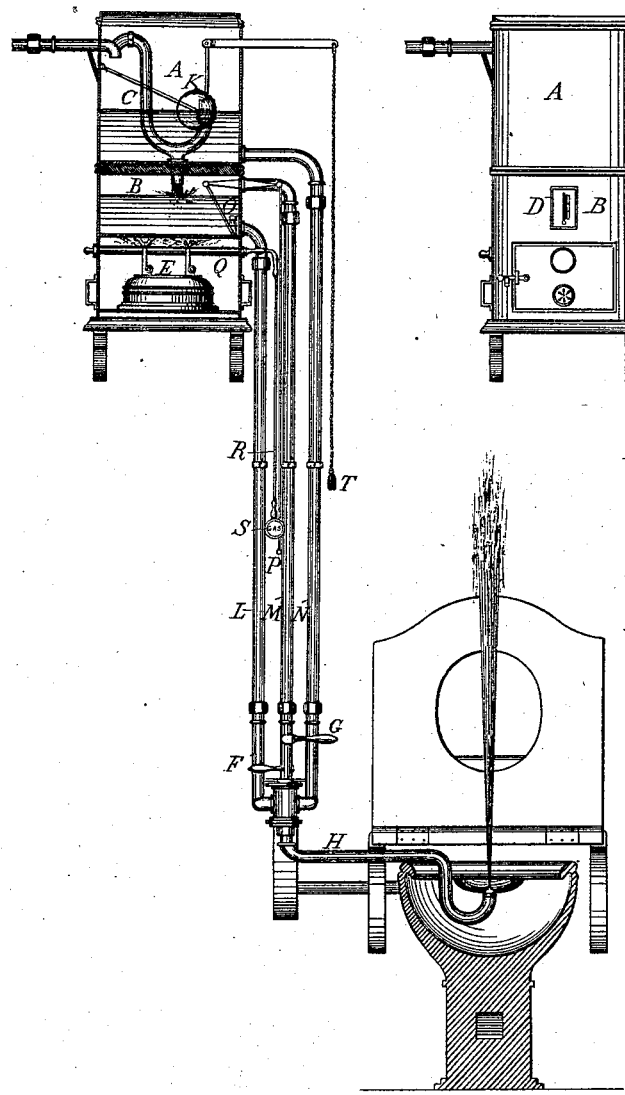
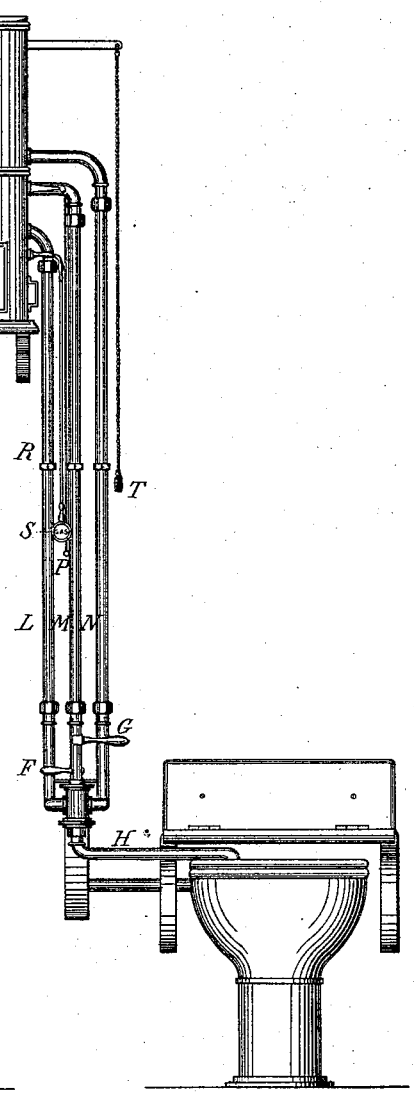
Witnesses:
T. C. A. Pfaff.
Leocadia M. Lennan.
Inventor;
Antonio Viale.
By his Attorney.
Edward P. Thompson (No Model.)  3 Sheets—Sheet 2.

A. VIALE.
WATER CLOSET.

No. 535,967.  Patented Mar. 19, 1895.

Witnesses:
T. C. A. Pfaff.
Leocadia M. Lennan.

Inventor
Antonio Viale.
by Edward P. Thompson
Attorney.

THE NORRIS PETERS CO., PHOTO-LITHO., WASHINGTON, D. C.

(No Model.) 3 Sheets—Sheet 3.
A. VIALE.
WATER CLOSET.
No. 535,967. Patented Mar. 19, 1895.
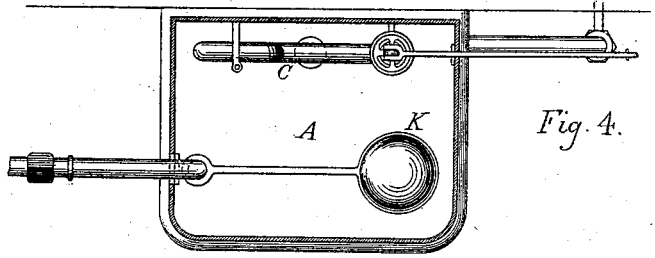
Fig. 4.
Fig. 5
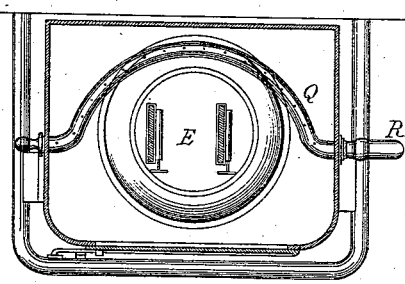
Fig. 6
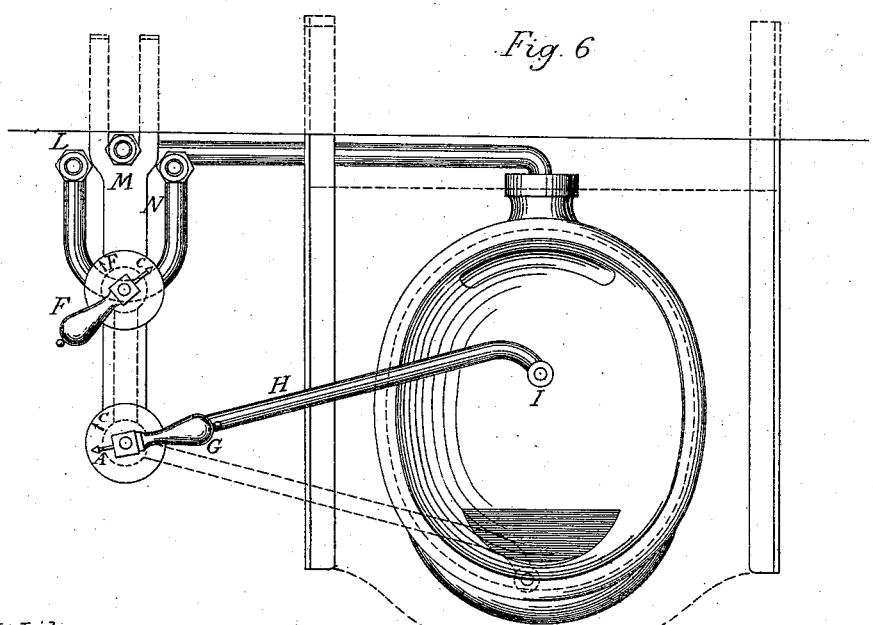
Witnesses:
T. C. A. Pfaff
Leocadia M. Lennan
Inventor.
Antonio Viale.
by Edward P. Thompson
Attorney.

UNITED STATES PATENT OFFICE.

ANTONIO VIALE, OF ROME, ITALY.

WATER-CLOSET.

SPECIFICATION forming part of Letters Patent No. 535,967, dated March 19, 1895.

Application filed March 19, 1894. Serial No. 504,225. (No model.) Patented in Italy January 9, 1894, LXIX, 274, XXVIII, 35,415.

*To all whom it may concern:*

Be it known that I, ANTONIO VIALE, a citizen of Italy, and a resident of the city of Rome, Italy, have invented certain new and useful Improvements in Water-Closets, (for which I have obtained Italian patents as follows: original patent, Reg. Att. LXIX, No. 274, Reg. Gen. XXVIII, No. 35,415, dated January 9, 1894, and patent of addition, Reg. Att. LXIX, No. 395, Reg. Gen. XXVIII, No. 35,546, dated January 30, 1894,) of which the following is a specification.

This invention has reference to improvements in or relating to closets, and the like whereby an ascending jet of water, which may be warm or cold as desired, can be directed toward the anus for the purpose of washing and cleaning the same after evacuation.

The invention may be applied either to siphon closets or to closets on any other system, and also to commodes such as are ordinarily used by invalids.

The apparatus employed for the purpose mentioned, comprises two vessels, one for cold water, and the other for the water intended to be heated, and pipes provided with cocks or valves whereby the water, either cold or warm as may be desired, is led to a movable pipe terminating in a special mouth-piece or nozzle from which the jet of water issues, the said vessels being placed at a suitable height to produce a jet of the desired force.

The heating of the water in one of the vessels can be effected by any suitable source of heat such as a gas flame or a flame from a mineral oil lamp.

Figure 7:
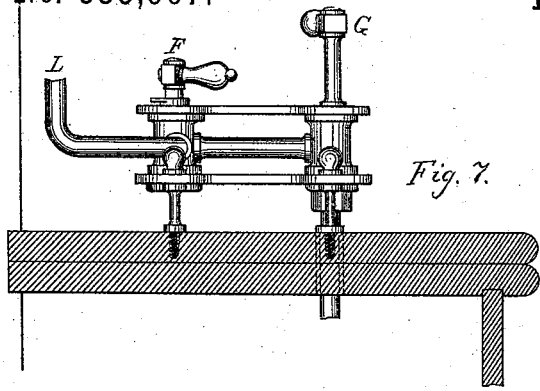
Figure 3:
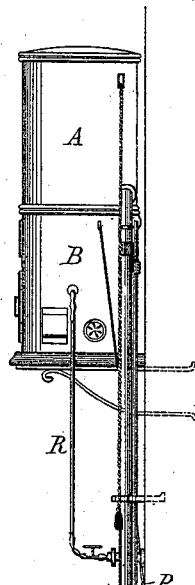
Figure 8:
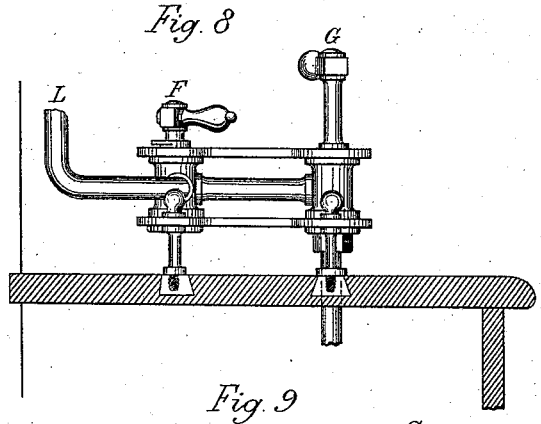
Figure 9:
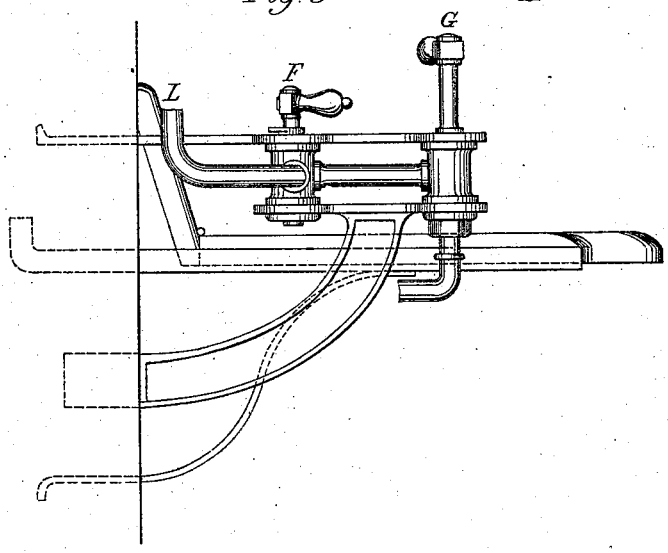

In the drawings Figure 1 shows partly in elevation, and partly in section, apparatus according to this invention applied to a pedestal water closet, which is also shown in section. Fig. 2 is a front view, and Fig. 3 a side view showing the whole of the apparatus and closet in elevation. Figs. 4 and 5 are horizontal sections on the lines $x\,x$ and $y\,y$ respectively of Fig. 1. Fig. 6 is a plan of the closet pan and of the arrangement of pipes used in connection therewith. Fig. 7 is a side-view of an arrangement of pipes applied to a wooden seat. Fig. 8 is a similar view to Fig. 7, showing the said pipes applied to a marble seat. Fig. 9 is also a similar view to Fig. 7, showing the arrangement of pipes supported by a special bracket.

A is a vessel for cold water, the flow of water to which is regulated by a float K.

B is a vessel reservoir for warm water, which is fed from the vessel A by means of the siphon C. The vessel B, which is provided with a thermometer for indicating the temperature of the water, may be heated either by a petroleum lamp E, or by the combustion of gas, which may be supplied from a pipe provided with a gas-cock S, and connected by an India rubber tube R, to a perforated burner pipe Q arranged below the bottom of the said vessel.

M is an overflow pipe attached to the vessel B and by which excess of water is led away from the said vessel in the event of the siphon C remaining open longer than is necessary to sufficiently charge the said vessel with water.

L is a discharge pipe for warm water the flow of which is controlled by a valve O adapted to be opened by means of a lever operated by a chain P.

N is a discharge pipe for cold water. F is a two-way cock provided with an indicating needle or pointer; and serving for distributing as desired the cold or the warm water conveyed to it by the pipes N and L respectively.

G is a cock coupled to a movable radial discharge pipe H carrying at its free end a mouth piece or discharge nozzle I the said cock G being also furnished with a needle or pointer to indicate whether it is open or closed. The pipe H should be of a form most suitable for the closet to which it is applied. Fig. 6 shows it in full lines in a position suitable for use and in dotted lines in the position into which it is moved when not required to be used. The mouth piece or nozzle I screwed on the end of the pipe H may be formed of any suitable material and may have one or more orifices of any suitable section. There may, of course, be several exchangeable and different nozzles I for the same apparatus.

The apparatus may be constructed with one water vessel only, if desired, for either warm or cold water, as may be preferred.

Having now particularly described and ascertained the nature of the said invention and in what manner the same is to be performed, I declare that what I claim is—

A closet or the like provided with means such as a pipe with nozzle movable horizontally from the center to the edge of bowl and adapted to be placed in connection with a supply of water under pressure and whereby a vertically ascending jet or jets of water can be obtained substantially as herein described for the purpose specified.

In witness whereof I have signed this specification in presence of two witnesses.

ANTONIO VIALE.

Witnesses:
S. B. ZANARD,
CHARLES M. WOOD.